United States Patent
Mansuy

(10) Patent No.: US 11,267,292 B2
(45) Date of Patent: Mar. 8, 2022

(54) HEAVY-DUTY VEHICLE TIRE

(71) Applicant: COMPAGNIE GENERALE DES ETABLISSEMENTS MICHELIN, Clermont-Ferrand (FR)

(72) Inventor: Philippe Mansuy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 355 days.

(21) Appl. No.: 16/091,890

(22) PCT Filed: Apr. 4, 2017

(86) PCT No.: PCT/FR2017/050782
§ 371 (c)(1),
(2) Date: Oct. 5, 2018

(87) PCT Pub. No.: WO2017/174916
PCT Pub. Date: Oct. 12, 2017

(65) Prior Publication Data
US 2019/0105949 A1 Apr. 11, 2019

(30) Foreign Application Priority Data
Apr. 8, 2016 (FR) .................. 16/53106

(51) Int. Cl.
*B60C 11/11* (2006.01)
*B60C 11/03* (2006.01)
*B60C 11/13* (2006.01)

(52) U.S. Cl.
CPC ...... *B60C 11/0309* (2013.01); *B60C 11/0302* (2013.01); *B60C 11/0304* (2013.01);
(Continued)

(58) Field of Classification Search
CPC . B60C 11/0316; B60C 11/0309; B60C 11/03; B60C 11/0302; B60C 2011/0372;
(Continued)

(56) References Cited

U.S. PATENT DOCUMENTS 6,527,024 B1 * 3/2003 Ashmore ............ B60C 11/0316
152/209.22
D492,246 S * 6/2004 Salvan ........................ D12/567
(Continued)

FOREIGN PATENT DOCUMENTS

JP    H 06 48122   2/1994
NZ    213 344      6/1987
(Continued)

*Primary Examiner* — Cedrick S Williams
(74) *Attorney, Agent, or Firm* — Cozen O'Connor

(57) ABSTRACT

Tread (2) of a radial tire for a heavy vehicle. The tire alternatingly rolls in laden and unladen states on ascent and descent, respectively. Tread (2) has total width $W_T$ and comprises first median portion (21) having median width $W_c$, where $0.2W_T \leq W_c \leq 0.5W_T$. Tread (2) axially delimited by second and third lateral portions (22, 23) that have respective lateral widths ($W_{S2}$, $W_{S3}$) at least equal to 25% and at most equal to 40% of total width $W_T$. Angle $A_{51}$ of leading face (51) of every element in relief (31) of first median portion (21) is strictly less than angle $A_{61}$ of trailing face (61) of said element in relief (31). Angle ($A_{52}$, $A_{53}$) of leading face (52, 53) of every element in relief (32, 33) of each of second and third lateral portions (22, 23) is strictly greater than angle ($A_{62}$, $A_{63}$) of trailing face (62, 63) of said element in relief (32, 33).

24 Claims, 4 Drawing Sheets

(52) U.S. Cl.
CPC ........... *B60C 11/11* (2013.01); *B60C 11/1323* (2013.01); *B60C 2200/065* (2013.01)

(58) Field of Classification Search
CPC .......... B60C 2200/06; B60C 2200/065; B60C 2200/04; B60C 2200/14; B60C 11/11
See application file for complete search history.

(56) References Cited

U.S. PATENT DOCUMENTS

| | | | | |
|---|---|---|---|---|
| 2001/0047840 | A1* | 12/2001 | Nanni | ................. B60C 11/0075 |
| | | | | 152/209.16 |
| 2006/0037684 | A1 | 2/2006 | Vervaet | |
| 2012/0132331 | A1* | 5/2012 | Collette | ................ B60C 11/005 |
| | | | | 152/209.5 |
| 2015/0336429 | A1* | 11/2015 | Dorfi | ......................... B60C 5/00 |
| | | | | 29/894.31 |

FOREIGN PATENT DOCUMENTS

| | | | | | |
|---|---|---|---|---|---|
| NZ | | 213345 A | * | 8/1988 | .............. B60C 11/11 |
| WO | WO 2004/085175 | | | 10/2004 | |

* cited by examiner

A - A

B - B

HEAVY-DUTY VEHICLE TIRE

RELATED APPLICATIONS

This is a U.S. National Phase Application under 35 USC 371 of International Application PCT/FR2017/050782 filed on Apr. 4, 2017.

This application claims the priority of French application no. 1653106 filed Apr. 8, 2016, the entire content of which is hereby incorporated by reference.

FIELD OF THE INVENTION

The subject of the present invention is a radial tire, intended to be fitted to a heavy vehicle of construction plant type, and the invention relates more particularly to the tread thereof.

BACKGROUND OF THE INVENTION

A radial tire for a heavy vehicle of construction plant type is intended to be mounted on a rim, the diameter of which is at least equal to 25 inches, according, for example, to the classification of the European Tire and Rim Technical Organisation or ETRTO standard. The invention is more particularly applicable to a radial tire intended to be mounted on a rim, the diameter of which is between 35 inches and 63 inches, but without being limited to this application.

The tread is that part of the tire that is intended to come into contact with the ground via a tread surface and to be worn away. The tread, which is formed by at least one elastomeric material, usually comprises a more or less complex system of cuts separating elements in relief, referred to as the tread pattern, the function of which is mainly to ensure that the tire exhibits a satisfactory performance in terms of longitudinal grip, under driving and braking forces, and transverse grip.

More specifically, a tire according to the invention is intended to be fitted to a vehicle of the dumper type, which ensures in particular the transport of materials extracted from opencast mines, such as ores or coal, for example. Such use, referred to as use in mines, consists, in a simplified manner, of an alternation of laden outbound cycles and unladen return cycles. In a laden outbound cycle, the laden vehicle transports the extracted materials, mainly uphill, from the loading zones at the bottom of the mine, or the bottom of the pit, to unloading zones. In an unladen return cycle, the empty vehicle returns, mainly downhill, towards the loading zones at the bottom of the mine.

Furthermore, the tracks on which the vehicles run are made up of materials generally taken from the mine, for example compacted crushed rocks which are regularly damped down in order to ensure the integrity of the wearing layer of the track as the vehicles pass over it. These tracks have a particularly abrasive action on the treads of the tires.

The load applied to the tire is dependent both on its position on the vehicle and on the duty cycle of the vehicle. By way of example, for a gradient of between 8.5% and 10%, during a laden outbound uphill cycle, around a third of the total load of the vehicle is applied to the front axle, which is generally fitted with two tires fitted singly, and two thirds of the total load of the vehicle are applied to the rear axle, which is generally fitted with four tires, mounted in twinned pairs. During the unladen downhill return cycle, for a gradient of between 8.5% and 10%, around half of the total load of the vehicle is applied to the front axle and half of the total load of the vehicle is applied to the rear axle. The tires fitted to dumpers are, as a general rule, fitted singly on the front axle of the vehicle for the first third of their life, then changed around and fitted as part of a twinned pair to the rear axle for the remaining two thirds of their life. The tires according to the invention are more particularly optimized for operation on the rear axle.

From an economic standpoint, transporting the materials extracted may represent up to 50% of the operating costs of the mine, and the contribution that the tires make to the costs of transport is significant. As a result, limiting the rate of wear of the tires is a key contributor to reducing the operating costs. From the tire manufacturer's standpoint, developing technical solutions that make it possible to reduce the rate of wear is therefore an important strategic objective.

The tires are subjected to high mechanical stress loadings, both locally, when running on tracks covered by indenting bodies consisting of stones, the average size of which is typically between 1 inch and 2.5 inches, and at an overall level, when running with significant turning moment over gradients of between 8.5% and 10% and during half-circle turns for the loading and unloading manoeuvres. These mechanical stress loadings lead to relatively rapid tire wear.

The technical solutions conceived of to date for reducing the rate of wear relate essentially to the design of the tread pattern, to the choice of the materials of which the tread is made, generally elastomeric compounds, and to optimizing the crown reinforcement radially on the inside of the tread. For example, in the field of tread patterns, the document WO 2004085175 describes the use of a tread, the elements in relief of the tread pattern of which exhibit an inclination of the front and rear faces that are differentiated and variable across the width of the tread so as to generate coupling forces that are dependent on the applied load, and thus modify the operating point of the tire in terms of slip, thereby limiting wearing phenomena. A coupling force is understood to be a circumferential force, tangent to the tread, generated by the applied load, caused by the Poisson effect on the elements in relief.

Since a tire has a geometry that exhibits symmetry of revolution about an axis of rotation, its geometry is usually described in a radial plane containing the axis of rotation of the tire. For a given radial plane, the radial, axial and circumferential directions denote the directions perpendicular to the axis of rotation of the tire, parallel to the axis of rotation of the tire and perpendicular to the radial plane, respectively. By convention, the expressions "radially inner and radially outer, respectively" mean "closer to and further away from the axis of rotation of the tire, respectively". "Axially inner and axially outer, respectively" is understood to mean "closer to and further away from the equatorial plane of the tire, respectively", the equatorial plane of the tire being the plane which passes through the middle of the tread surface of the tire and is perpendicular to the axis of rotation of the tire.

SUMMARY OF THE INVENTION

One object of the invention is to reduce the rate of wear of the tread of a radial tire for a heavy vehicle of construction plant type, which is subjected to high mechanical stress loadings brought about by use in mines, characterized mainly by an alternation of laden outbound uphill cycles and unladen downhill return cycles.

This object has been achieved, according to one aspect of the invention, by a tire for a heavy vehicle of construction plant type that is intended for use in mines, characterized by an alternation of rolling in a laden state on an ascending slope and in an unladen state on a descending slope:

the tire comprising a tread having a total width and comprising a first median portion, axially delimited by a second and a third lateral portion, respectively, the first median portion having a median width at least equal to 20% and at most equal to 50% of the total width, and comprising elements in relief that are separated from one another by cuts, each element in relief comprising a leading face, which is intended to come into contact with the ground first and forms an angle with a radial plane, and a trailing face, which is intended to come into contact with the ground last and forms an angle with a radial plane, each of the second and third lateral portions having a respective lateral width at least equal to 25% and at most equal to 40% of the total width, and respectively comprising elements in relief that are separated from one another by cuts, each element in relief comprising a leading face, which forms an angle with a radial plane, and a trailing face, which forms an angle with a radial plane, the angle of the leading face of every element in relief of the first median portion being strictly less than the angle of the trailing face of said element in relief, and the angle of the leading face of every element in relief of each of the second and third lateral portions being strictly greater than the angle of the trailing face of said element in relief.

Every element in relief of the tread is delimited, in the circumferential direction, by a leading face and a trailing face, and, in a radial direction, radially on the outside by a contact face intended to come into contact with the ground. The leading face is understood to be the face of which the radially outer corner edge, the intersection of the leading face and the contact face, comes into contact with the ground first. The trailing face is understood to be the face of which the radially outer corner edge, the intersection of the trailing face and the contact face, comes into contact with the ground last.

A leading face and a trailing face, which are generally substantially flat, are respectively characterized by the angle that they form with a radial plane that contains the axis of rotation of the tire and passes through the radially outer corner edge of the face. Usually, this angle is constant in the axial direction, that is to say across the width of the tread, but it may be variable in the axial direction, in which case a mean angle is then taken into account. This angle is normally known as the relief angle. In a local frame of reference defined by a circumferential axis, tangent to the circumference of the tire and oriented in the direction of rotation of the tire, and by a radial axis, perpendicular to the circumference of the tire and oriented towards the axis of rotation of the tire, the angle of the leading face is an angle oriented positively in the anticlockwise direction. In this same local frame of reference, the angle of the trailing face is an angle oriented positively in the clockwise direction.

Every element in relief is subjected, at its contact face, to a circumferential coupling force, known as elementary coupling force, and to a circumferential slip force, known as elementary slip force, the resultant of these two forces being known as the resultant elementary force. The elementary coupling force is the force applied to the element in relief by the ground in reaction to the tangential stresses brought about by the load applied and to the element in relief by the Poisson effect. The elementary slip force is the force applied to the element in relief by the ground in reaction to the driving slip or braking slip of the tire that are brought about by the engine torque or braking torque applied to the tire, when the tire is mounted on a rear axle of the vehicle. More specifically, this elementary slip force results from the difference in speed between the crown reinforcement of the tire, radially inside the tread, and the ground.

For the first median portion and each of the second and third lateral portions, a median coupling force and a lateral coupling force, a median slip force and a lateral slip force, and a resultant median force and a resultant lateral force, respectively, are defined. The median coupling force, median slip force and resultant median force are dependent on the elementary coupling force, elementary slip force and resultant elementary force, respectively, that are applied to the elements in relief of the first median portion, but also on the mechanical interactions with the second and third lateral portions. Analogously, the lateral coupling force, lateral slip force and resultant lateral force are dependent on the elementary coupling force, elementary slip force and resultant elementary force, respectively, that are applied to the elements in relief of the second or third lateral portion, but also on the mechanical interactions with the first median portion.

At the overall level of the tread, an overall coupling force, an overall slip force and a resultant overall force, respectively, are defined. The overall coupling force, overall slip force and resultant overall force are the resultants of the median and lateral coupling forces, median and lateral slip forces and resultant median and lateral forces, respectively.

A tread pattern is provided that makes it possible to generate an overall coupling force in the same direction as the resultant overall force, both under engine torque and under braking torque, for a tire mounted on a driven axle. Since the overall coupling force thus generates a part of the resultant overall force necessary for moving the vehicle forward, it reduces the overall slip force by the same amount, and so the slip of the tread on the ground is reduced compared with a tread without an overall coupling force, and correspondingly, the wear of the tread, which is a function of the slip and the contact pressure, is reduced, both under engine torque and under braking torque.

To this end, an embodiment of the invention combines a first median portion, for which the angle of the leading face of every element in relief is strictly less than the angle of the trailing face of said element in relief, with a second and a third lateral portion, for each of which the angle of the leading face of every element in relief is strictly greater than the angle of the trailing face of said element in relief.

Under engine torque, with the vehicle laden, the tread comes into contact with the ground across its entire axial width: the first median portion and each of the second and third lateral portions then come into contact with the ground in their entirety. In this configuration, the load borne by the first median portion is less than the load borne by the second and third lateral portions together. The median coupling force, which is proportional to the load applied to the first median portion at a given level of coupling, is consequently less than the sum of the lateral coupling forces, which are proportional to the load applied to the second and third lateral portions, respectively, at the same given level of coupling. Moreover, given the choice of angles of the leading and trailing faces of the elements in relief of the first median portion and the second and third lateral portions, respectively, the median coupling force is of opposite sign to each lateral coupling force. Consequently, the overall coupling force, which is the algebraic sum of the median coupling force and the lateral coupling forces, is of the same sign as the lateral coupling forces and of the same sign as the resultant overall driving force, oriented in the direction of movement of the tire. Consequently, the overall coupling force contributes positively to the overall driving force, thereby reducing the share of the overall driving slip force, and thus the slip of the tread on the ground and thus the wear.

Under braking torque, with the vehicle unladen, the tread comes into contact with the ground across a part of its axial width: the first median portion comes into contact with the ground in its entirety, while each of the second and third lateral portions comes into contact with the ground partially. In this configuration, the load borne by the first median portion is greater than the load borne by the second and third lateral portions together. The median coupling force, which is proportional to the load applied to the first median portion at a given level of coupling, is consequently greater than the sum of the lateral coupling forces, which are proportional to the load applied to the second and third lateral portions, respectively, at the same given level of coupling. Moreover, given the choice of angles of the leading and trailing faces of the elements in relief of the first median portion and the second and third lateral portions, respectively, the median coupling force is of opposite sign to each lateral coupling force. Consequently, the overall coupling force, which is the algebraic sum of the median coupling force and the lateral coupling forces, is of the same sign as the median coupling force and of the same sign as the resultant overall braking force, oriented in the opposite direction to the movement of the tire. Consequently, the overall coupling force contributes positively to the overall braking force, thereby reducing the share of the overall braking slip force, and thus the slip of the tread on the ground and thus the wear.

According to a preferred embodiment, the first median portion is symmetric with respect to an equatorial plane passing through the middle of the tread and perpendicular to the axis of rotation of the tire. This means that the second and third lateral portions have identical lateral widths. This design makes it possible to have an even distribution of the forces between the two lateral portions and represents the usual embodiment.

Advantageously, the angle of the leading face of every element in relief of the first median portion is at least equal to 6° and at most equal to 12°. This range of angles makes it possible to limit the tangential stresses brought about by the Poisson effect on the ground in the vicinity of the leading edge.

Further advantageously, the angle of the trailing face of every element in relief of the first median portion is at least equal to 15° and at most equal to 35°. This range of angles makes it possible to have a level of tangential stresses brought about by the Poisson effect on the ground in the vicinity of the trailing edge, that is greater than the level of tangential stresses brought about by the Poisson effect on the ground in the vicinity of the leading edge.

Likewise advantageously, the difference between the angle of the trailing face and the angle of the leading face of every element in relief of the first median portion is at least equal to 5° and at most equal to 30°. This feature ensures a difference between the tangential stresses brought about by the Poisson effect on the ground in the vicinity of the trailing edge and in the vicinity of the leading edge, respectively, generating the desired elementary coupling force.

Advantageously, the angle of the leading face of every element in relief of each of the second and third lateral portions is at least equal to 15° and at most equal to 35°. This range of angles makes it possible to have a minimum level of tangential stresses brought about by the Poisson effect on the ground in the vicinity of the leading edge.

Further advantageously, the angle of the trailing face of every element in relief of each of the second and third lateral portions is at least equal to 6° and at most equal to 12°. This range of angles makes it possible to limit tangential stresses brought about by the Poisson effect on the ground in the vicinity of the trailing edge, to less than the level of tangential stresses brought about by the Poisson effect on the ground in the vicinity of the leading edge.

Likewise advantageously, the difference between the angle of the leading face and the angle of the trailing face of every element in relief of each of the second and third lateral portions is at least equal to 5° and at most equal to 30°. This feature ensures a difference between the tangential stresses brought about by the Poisson effect on the ground in the vicinity of the leading edge and in the vicinity of the trailing edge, respectively, generating the desired elementary coupling force.

According to a variant embodiment of the tread, the tread is formed by the radial superposition of at least one radially inner first elastomeric material and a radially outer second elastomeric material. This design makes it possible to adapt the compromise between the performances of wear, grip, resistance to mechanical attack and temperature resistance of the crown of the tire during the lifetime of the tire.

According to another variant embodiment of the tread, the first median portion is formed by a median elastomeric material and each of the second and third lateral portions is formed by a lateral elastomeric material different from the median elastomeric material. This design makes it possible to optimize the compromise between the performances of wear, grip, resistance to mechanical attack and temperature resistance of the crown of the tire, depending on the region of the tread.

The two above-described variant embodiments of the tread can obviously be combined with differentiation of the elastomeric material both across the axial width and in the radial depth of the tread, in order to have even more precise optimization of the performances both per region of the tread and over time, at various levels of wear of the tread.

BRIEF DESCRIPTION OF THE DRAWINGS

Features of embodiments of the invention are illustrated in the schematic figures, which are not to scale and described below.

DETAILED DESCRIPTION OF THE DRAWINGS

Figure 1A:
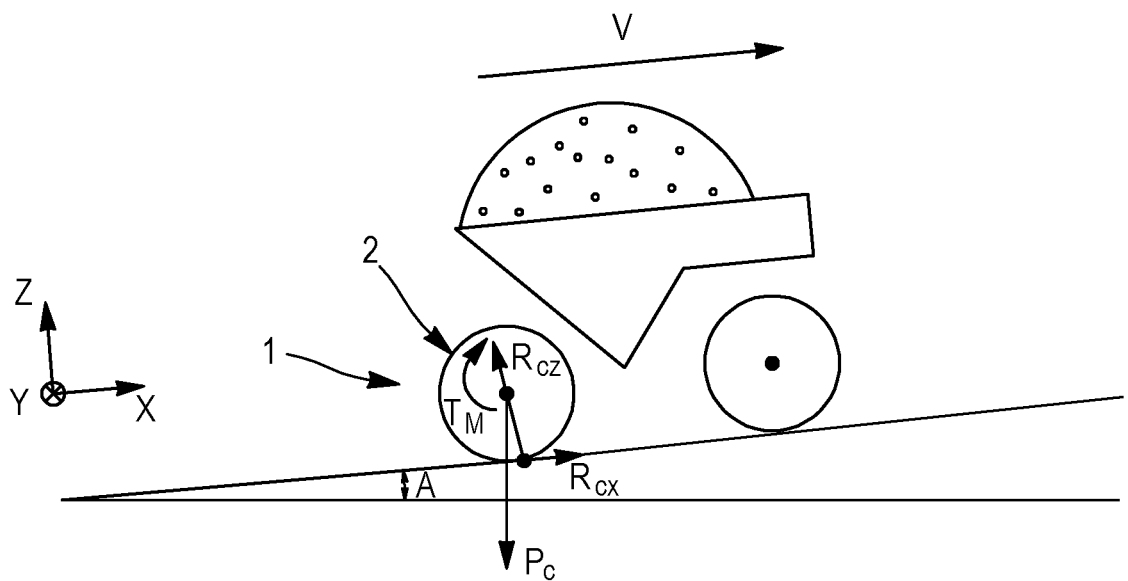
FIG. 1A: laden outbound uphill cycle of a dumper

FIG. 1A shows a laden outbound uphill cycle of a dumper. The laden dumper is climbing a gradient of angle A. Each tire 1, mounted on a driven axle, is subjected to an engine torque $T_M$ and to a load $P_C$. The reactions of the ground on the tread 2 of the tire are a circumferential driving force $R_{CX}$, oriented in the direction of movement V of the dumper, and a radial force $R_{CZ}$, respectively.

Figure 1B:
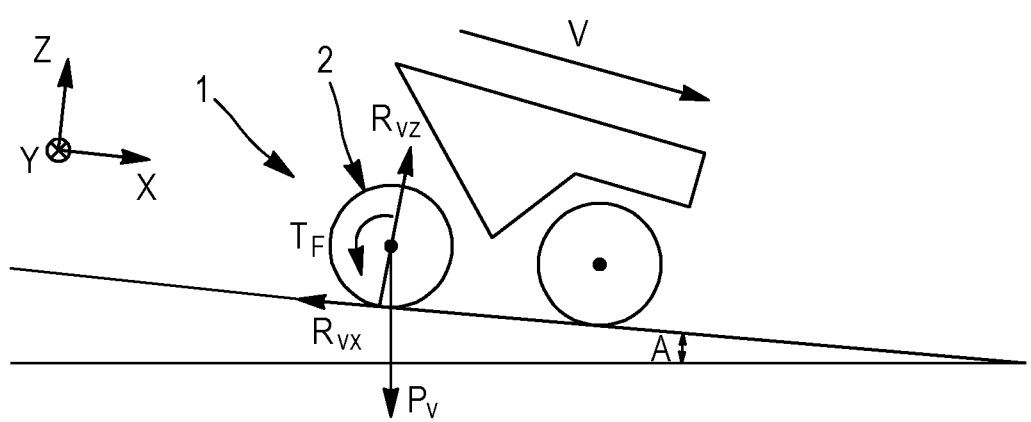
FIG. 1B: unladen return downhill cycle of a dumper

FIG. 1B shows an unladen return downhill cycle of a dumper. The unladen dumper is descending a gradient of angle A. Each tire 1, mounted on a driven axle, is subjected to a braking torque $T_F$ and to a load $P_V$. The reactions of the ground on the tread 2 of the tire are a circumferential braking force $R_{VX}$, oriented in the opposite direction to the movement V of the dumper, and a radial force $R_{VZ}$, respectively.

Figure 2A:
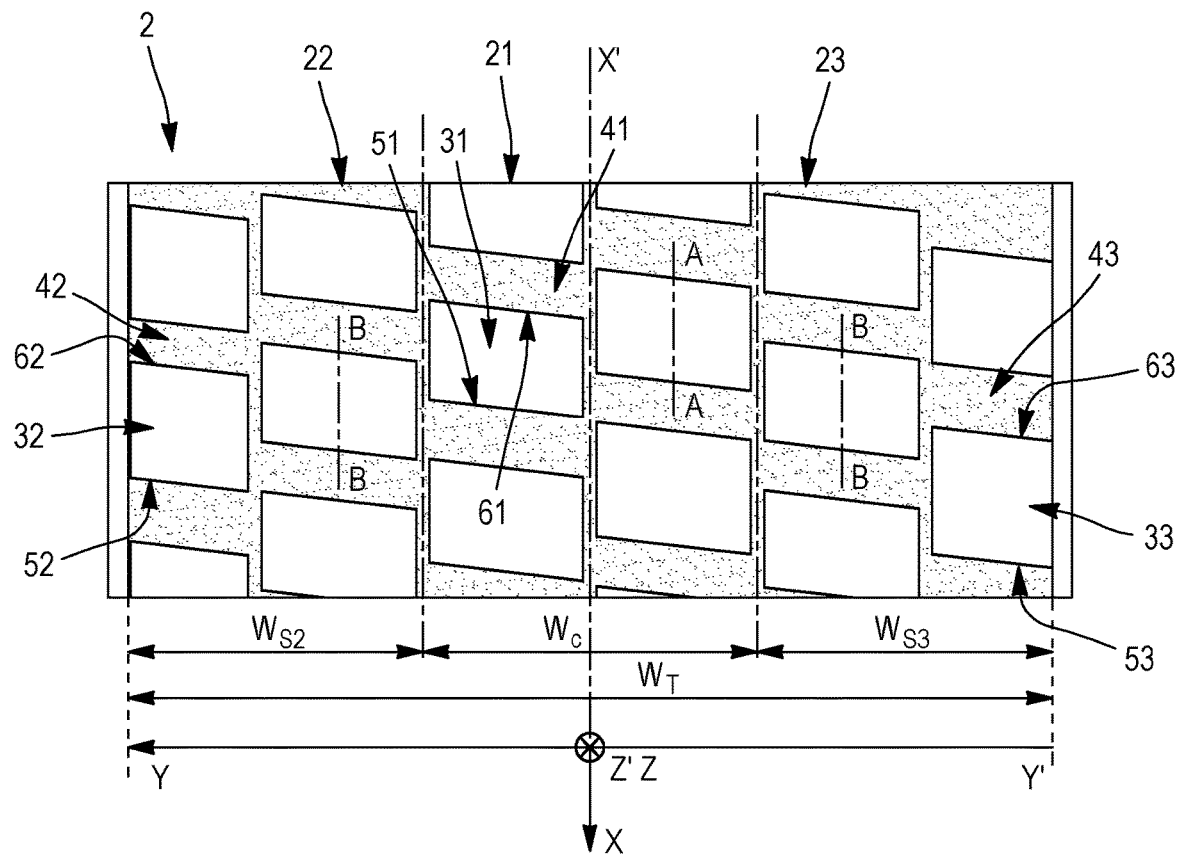
FIG. 2A: partial view from above of a tread of a tire according to an embodiment of the invention

FIG. 2A is partial view from above of a tread 2 of a tire according to the invention. The tread 2 has a total width $W_T$ and comprises a first median portion 21, axially delimited by a second and a third lateral portion 22, 23, respectively. The first median portion 21 has a median width $W_c$ at least equal to 20% and at most equal to 50% of the total width $W_T$, and comprises elements in relief 31 that are separated from one another by cuts 41, each element in relief 31 comprising a leading face 51, which is intended to come into contact with the ground first, and a trailing face 61, which is intended to come into contact with the ground last. Each of the second and third lateral portions (22, 23) has a respective lateral width ($W_{S2}$, $W_{S3}$) at least equal to 25% and at most equal to 40% of the total width $W_T$, and respectively comprises elements in relief (32, 33) that are separated from one another by cuts (42, 43), each element in relief (32, 33) comprising a leading face (52, 53) and a trailing face (62, 63).

Figure 2B:
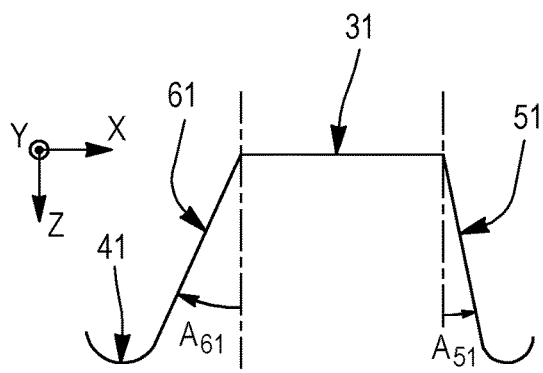
FIG. 2B: cross-sectional view of an element in relief of the first median portion

FIG. 2B is a cross-sectional view of an element in relief 31 of the first median portion, which is separated from the adjacent elements in relief by a cut 41. Each element in relief 31 comprises a leading face 51, which is intended to come into contact with the ground first and forms an angle $A_{51}$ with a radial plane YZ, and a trailing face 61, which is intended to come into contact with the ground last and forms an angle $A_{61}$ with a radial plane YZ. The angles $A_{51}$ and $A_{61}$ are usually known as relief angles. In a local frame of reference XZ defined by a circumferential axis X, tangent to the circumference of the tire and oriented in the direction of rotation of the tire, and by a radial axis Z, perpendicular to the circumference of the tire and oriented towards the axis of rotation of the tire, the angle $A_{51}$ of the leading face 51 is an angle oriented positively in the anticlockwise direction. In this same local frame of reference, the angle $A_{61}$ of the trailing face 61 is an angle oriented positively in the clockwise direction. According to the invention, the angle $A_{51}$ of the leading face 51 of every element in relief 31 of the first median portion 21 is strictly less than the angle $A_{61}$ of the trailing face 61 of said element in relief 31.

Figure 2C:
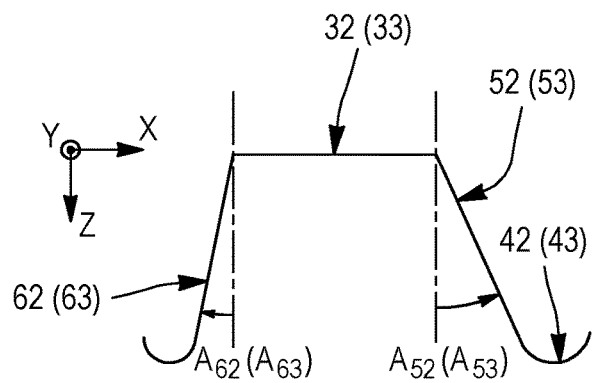
FIG. 2C: cross-sectional view of an element in relief of a second or third lateral portion

Analogously, FIG. 2C is a cross-sectional view of an element in relief (32, 33) of a second or third lateral portion, which is separated from the adjacent elements in relief by a cut (42, 43). Each element in relief (32, 33) comprises a leading face (52, 53), which is intended to come into contact with the ground first and forms an angle ($A_{52}$, $A_{53}$) with a radial plane YZ, and a trailing face (62, 63), which is intended to come into contact with the ground last and forms an angle ($A_{62}$, $A_{63}$) with a radial plane YZ. The angles ($A_{52}$, $A_{53}$) and ($A_{62}$, $A_{63}$) are usually known as relief angles. In a local frame of reference XZ defined by a circumferential axis X, tangent to the circumference of the tire and oriented in the direction of rotation of the tire, and by a radial axis Z, perpendicular to the circumference of the tire and oriented towards the axis of rotation of the tire, the angle ($A_{52}$, $A_{53}$) of the leading face (52, 53) is an angle oriented positively in the anticlockwise direction. In this same local frame of reference, the angle ($A_{62}$, $A_{63}$) of the trailing face (62, 63) is an angle oriented positively in the clockwise direction. According to the invention, the angle ($A_{52}$, $A_{53}$) of the leading face (52, 53) of every element in relief (32, 33) of each of the second and third lateral portions (22, 23) is strictly greater than the angle ($A_{62}$, $A_{63}$) of the trailing face (62, 63) of said element in relief (32, 33).

Figures 3A, 3B:
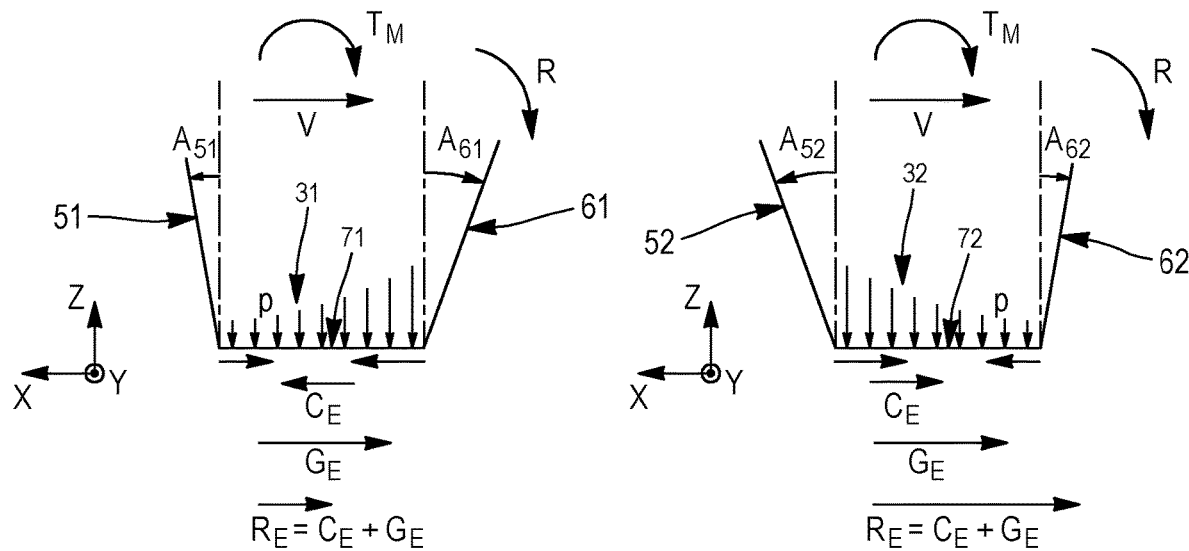
FIG. 3A: mechanical operation of an element in relief of the first median portion, under engine torque and in a laden state
FIG. 3B: mechanical operation of an element in relief of a second or third lateral portion, under engine torque and in a laden state

FIG. 3A schematically shows the mechanical operation of an element in relief 31 of the first median portion, under engine torque $T_M$ and in a laden state, the tire having a direction of rotation R. Given that the angle $A_{51}$ of the leading face 51 is strictly less than the angle $A_{61}$ of the trailing face 61, the elementary coupling force $C_E$ applied to the contact face 71, generated by the Poisson effect by the applied pressure p that increases from the leading edge of the leading face 51 at the small relief angle $A_{51}$ to the trailing edge of the trailing face 61 at the large relief angle $A_{61}$, is in the opposite direction to the movement V. Under the action of the engine torque $T_M$, the elementary slip force $G_E$ applied to the contact face 71, in the same direction as the movement V, is added algebraically to the elementary coupling force $C_E$ in order to give the resultant elementary force $R_E$, in the same direction as the movement V.

FIG. 3B schematically shows the mechanical operation of an element in relief 32 of a second (or third) lateral portion, under engine torque $T_M$ and in a laden state, the tire having a direction of rotation R. Given that the angle $A_{52}$ of the leading face 52 is strictly greater than the angle $A_{62}$ of the trailing face 62, the elementary coupling force $C_E$ applied to the contact face 72, generated by the Poisson effect by the applied pressure p that decreases from the leading edge of the leading face 52 at the large relief angle $A_{52}$ to the trailing edge of the trailing face 62 at the small relief angle $A_{62}$, is in the same direction as the movement V. Under the action of the engine torque $T_M$, the elementary slip force $G_E$ applied to the contact face 72, in the same direction as the movement V, is added algebraically to the elementary coupling force $C_E$ in order to give the resultant elementary force $R_E$, in the same direction as the movement V.

Figures 4A, 4B:
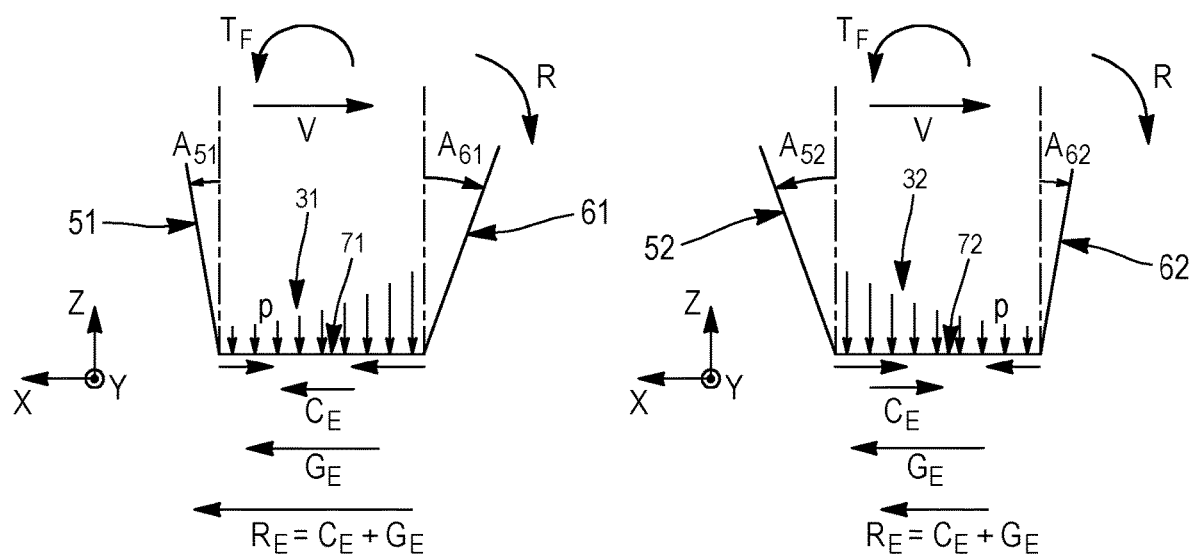
FIG. 4A: mechanical operation of an element in relief of the first median portion, under braking torque and in an unladen state
FIG. 4B: mechanical operation of an element in relief of a second or third lateral portion, under braking torque and in an unladen state

FIG. 4A schematically shows the mechanical operation of an element in relief 31 of the first median portion, under braking torque $T_F$ and in an unladen state, the tire having a direction of rotation R. Given that the angle $A_{51}$ of the leading face 51 is strictly less than the angle $A_{61}$ of the trailing face 61, the elementary coupling force $C_E$ applied to the contact face 71, generated by the Poisson effect by the applied pressure p that increases from the leading edge of the leading face 51 at the small relief angle $A_{51}$ to the trailing edge of the trailing face 61 at the large relief angle $A_{61}$, is in the opposite direction to the movement V. Under the action of the braking torque $T_F$, the elementary slip force $G_E$ applied to the contact face 71, in the opposite direction to the movement V, is added algebraically to the elementary coupling force $C_E$ in order to give the resultant elementary force $R_E$, in the opposite direction to the movement V.

FIG. 4B schematically shows the mechanical operation of an element in relief 32 of a second (or third) lateral portion, under braking torque $T_F$ and in an unladen state, the tire having a direction of rotation R. Given that the angle $A_{52}$ of the leading face 52 is strictly greater than the angle $A_{62}$ of the trailing face 62, the elementary coupling force $C_E$ applied to the contact face 72, generated by the Poisson effect by the applied pressure p that decreases from the leading edge of the leading face 52 at the large relief angle $A_{52}$ to the trailing edge of the trailing face 62 at the small relief angle $A_{62}$, is in the same direction as the movement V. Under the action of the braking torque $T_F$, the elementary slip force $G_E$ applied to the contact face 72, in the opposite direction to the movement V, is added algebraically to the elementary coupling force $C_E$ in order to give the resultant elementary force $R_E$, in the opposite direction to the movement V.

Figure 5A:
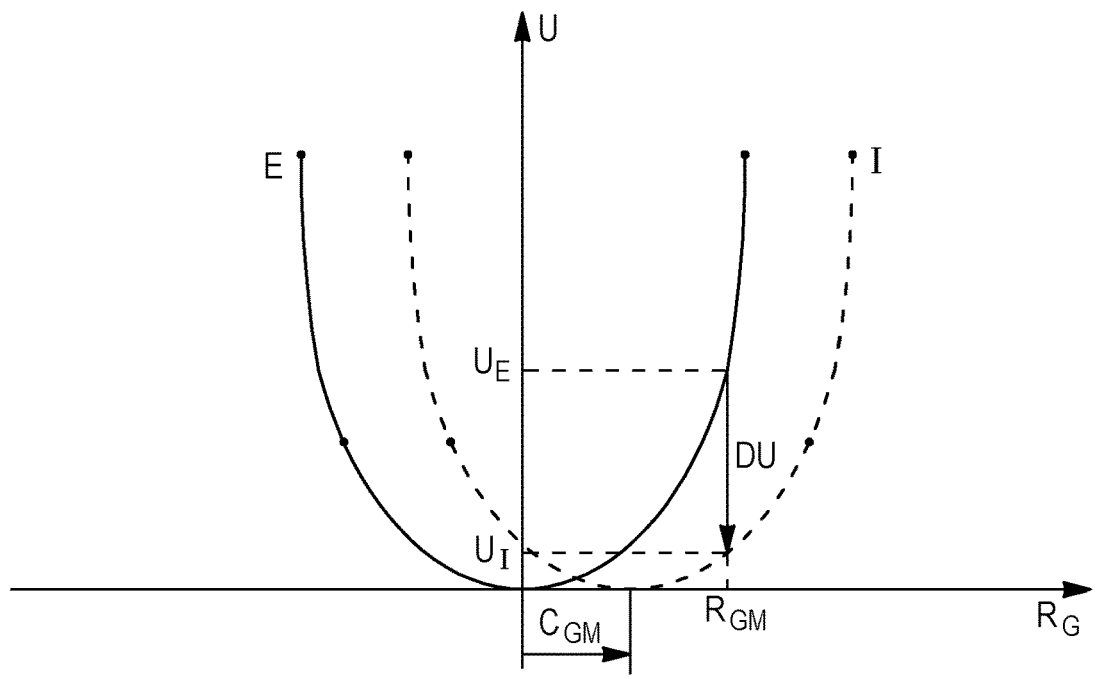
FIG. 5A: canonical curves of wear as a function of the resultant overall force for a tire of the prior art E and for a tire according to the invention I, in a laden state

FIG. 5A shows typical canonical curves of wear as a function of the resultant overall force for a tire of the prior art E and for a tire according to the invention I, respectively, in a laden state. On the ordinate axis, the wear indicator U is a loss of mass (for example, expressed in g/km) or a loss of tread pattern height (for example, expressed in mm/km). On the abscissa axis, the resultant overall force $R_G$ (for example, expressed in daN) applied to the tread by the ground is shown. Compared with a tire of the prior art E, the addition of an overall driving coupling force $C_{GM}$ makes it possible offset a value $C_{GM}$ of the canonical curve of wear in the direction of the increasing resultant overall forces $R_G$. At a given resultant overall driving force $R_{GM}$, the wear indicator U decreases from the value $U_E$ for a tire of the prior art to the value $U_1$ for a tire according to the invention, hence a reduction in wear DU.

Figure 5B:
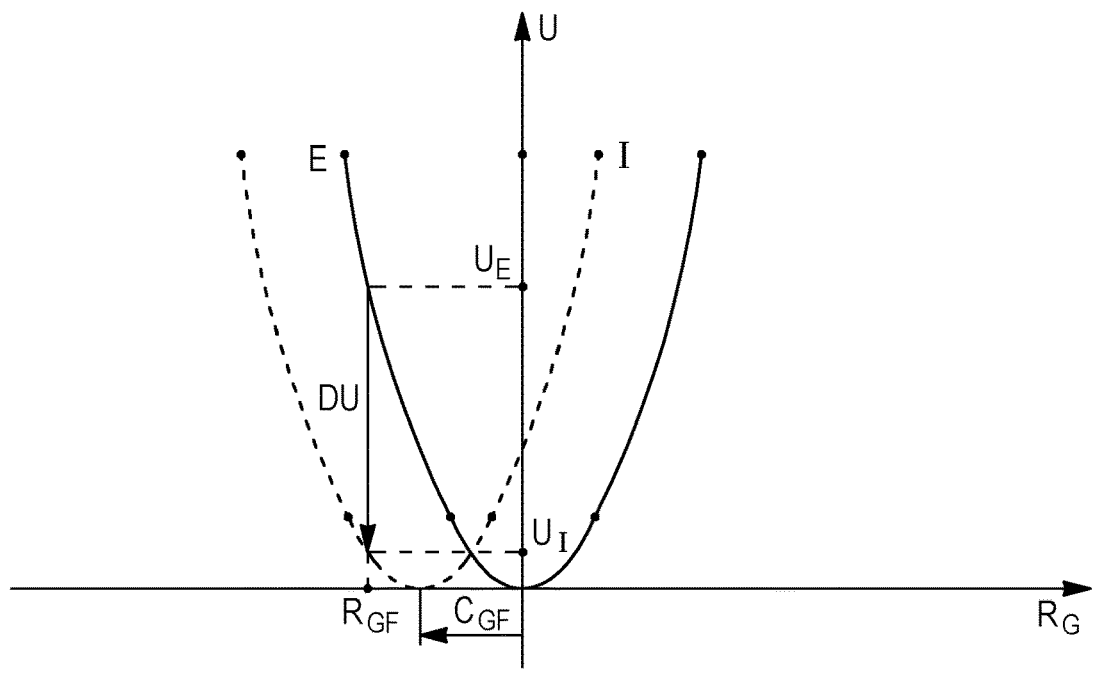
FIG. 5B: canonical curves of wear as a function of the resultant overall force for a tire of the prior art E and for a tire according to the invention I, in an unladen state.

FIG. 5B shows typical canonical curves of wear as a function of the resultant overall force for a tire of the prior art E and for a tire according to the invention I, respectively, in an unladen state. Compared with a tire of the prior art E, the addition of an overall braking coupling force $C_{GF}$ makes it possible offset a value $C_{GF}$ of the canonical curve of wear in the direction of the decreasing resultant overall forces $R_G$. At a given resultant overall braking force $R_{GF}$, the wear indicator U decreases from the value $U_E$ for a tire of the prior art to the value $U_1$ for a tire according to the invention, hence a reduction in wear DU.

The invention has been studied more particularly in the case of a tire of size 40.00R57, fitted to a rigid dumper with a total load capacity of 320 tonnes, and in the case of a tire of size 24.00R35, fitted to a rigid dumper with a total load capacity of 100 tonnes.

The following Table 1 presents an example of the distribution of loads and coupling forces, between the first median portion and the second and third lateral portions of a tread of a tire according to the invention, the tire being mounted on a rear axle of a mining dumper carrying out an alternation of laden uphill outbound cycles and unladen downhill return cycles.

TABLE 1

| | First median portion | Second lateral portion | Third lateral portion | Overall tread |
|---|---|---|---|---|
| Load applied Z, in laden state under engine torque | $0.4 * Z_C$ | $0.3 * Z_C$ | $0.3 * Z_C$ | $Z_C$ |
| Coupling force C, in laden state under engine torque | $-X * 0.4 * Z_C$ | $+X * 0.3 * Z_C$ | $+X * 0.3 * Z_C$ | $+X * 0.2 * Z_C$ |
| Load applied Z, in unladen state under braking torque | $0.8 * Z_V$ | $0.1 * Z_V$ | $0.1 * Z_V$ | $Z_V$ |
| Coupling force C, in unladen state under braking torque | $-X * 0.8 * Z_V$ | $+X * 0.1 * Z_V$ | $+X * 0.1 * Z_V$ | $-X * 0.6 * Z_V$ |

In Table 1, the forces Z are the loads applied per portion of tread and generally to the entire tread, and the forces C are the corresponding coupling forces, generated by the Poisson effect. The ratio C/Z=X is, by definition, the level of coupling.

Under engine torque and in a laden state, the first median portion bears 40% of the total load $Z_C$ and the second and third lateral portions bear 60% of the total load $Z_C$, since the tread is in full contact with the ground across its entire width. With the directions of the coupling forces being reversed between the median portion and the lateral portions, the overall coupling force, equal to +X times 20% of the total load $Z_C$, is added to the overall driving slip force.

Under braking torque and in an unladen state, the first median portion bears 80% of the total load $Z_V$ and the second and third lateral portions bear only 20% of the total load $Z_V$, since the tread is in partial contact with the ground in the second and third lateral portions. With the directions of the coupling forces being reversed between the median portion and the lateral portions, the overall coupling force, equal to -X times 60% of the total load $Z_V$, is added to the overall braking slip force.

In the example described above, the coupling levels are presumed to be identical between the first median portion and the second and third lateral portions. More generally, these respective median and lateral coupling levels can be different.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy vehicle of construction plant type that is adapted for use in mines, and alternatingly rolls in a laden state on an ascending slope and in an unladen state on a descending slope, wherein the tire comprises:
   a tread having a total width WT and comprising a first median portion, axially delimited by a second and a third lateral portion, respectively;
   the first median portion having a median width $W_c$ at least equal to 20% and at most equal to 50% of the total width $W_T$, and comprising elements in relief that are separated from one another by cuts, each said element in relief comprising a leading face, which is adapted to come into contact with the ground first and forms an angle $A_{51}$ with a radial plane, and a trailing face, which is adapted to come into contact with the ground last and forms an angle $A_{61}$ with the radial plane;

each of the second and third lateral portions having a respective lateral width at least equal to 25% and at most equal to 40% of the total width $W_T$, and respectively comprising elements in relief that are separated from one another by cuts, each said element in relief comprising a leading face, which forms an angle with the radial plane, and a trailing face, which forms an angle with the radial plane, wherein the angle $A_{51}$ of the leading face of every said element in relief of the first median portion is strictly less than the angle $A_{61}$ of the trailing face of said element in relief, and wherein the angle of the leading face of every said element in relief of each of the second and third lateral portions is strictly greater than the angle of the trailing face of said element in relief, wherein an angle of each leading face of each element in relief with respect to a circumferential plane is a same sign, and wherein an angle of each trailing face of each element in relief with respect to the circumferential plane is a same sign, wherein a level of coupling is given by
C/Z=X,
where:
forces Z are loads applied per portion of tread; and
forces C are corresponding coupling forces,
wherein under engine torque and in a laden state:
the first median portion bears 40% of the total load Zc and
the second and third lateral portions bear 60% of the total load Zc, since the tread is in full contact with the ground across its entire width, and
wherein with a direction of the coupling forces reversed between the median portion and the lateral portions, an overall coupling force, equal to +X times 20% of the total load Zc, is added to an overall driving slip force.

2. The tire for a heavy vehicle of construction plant type according to claim 1, wherein the angle $A_{51}$ of the leading face of every said element in relief of the first median portion is at least equal to 6° and at most equal to 12°.

3. The tire for a heavy vehicle of construction plant type according to claim 1, wherein the angle $A_{61}$ of the trailing face of every said element in relief of the first median portion is at least equal to 15° and at most equal to 35°.

4. The tire for a heavy vehicle of construction plant type according to claim 1, wherein the difference between the angle $A_{61}$ of the trailing face and the angle $A_{51}$ of the leading face of every said element in relief of the first median portion is at least equal to 5° and at most equal to 30°.

5. The tire for a heavy vehicle of construction plant type according to claim 1, wherein the angle of the leading face of every said element in relief of each of the second and third lateral portions is at least equal to 15° and at most equal to 35°.

6. The tire for a heavy vehicle of construction plant type according to claim 1, wherein the angle of the trailing face of every said element in relief of each of the second and third lateral portions is at least equal to 6° and at most equal to 12°.

7. The tire for a heavy vehicle of construction plant type according to claim 1, wherein the difference between the angle of the leading face and the angle of the trailing face of every said element in relief of each of the second and third lateral portions is at least equal to 5° and at most equal to 30°.

8. The tire for a heavy vehicle of construction plant type according to claim 1, wherein the tread is formed by the radial superposition of at least one radially inner first elastomeric material and a radially outer second elastomeric material.

9. The tire for a heavy vehicle of construction plant type according to claim 1, wherein the first median portion is formed by a median elastomeric material and each of the second and third lateral portions is formed by a lateral elastomeric material different from the median elastomeric material.

10. The tire for a heavy vehicle of construction plant type according to claim 1, wherein a level of coupling is given by
C/Z=X,
where:
forces Z are loads applied per portion of tread; and
forces C are corresponding coupling forces.

11. The tire for a heavy vehicle of construction plant type according to claim 1, wherein the first median portion is symmetric with respect to an equatorial plane passing through the middle of the tread and perpendicular to the axis of rotation of the tire.

12. A tire for a heavy vehicle of construction plant type that is adapted for use in mines, and alternatingly rolls in a laden state on an ascending slope and in an unladen state on a descending slope, wherein the tire comprises:
a tread having a total width $W_T$ and comprising a first median portion, axially delimited by a second and a third lateral portion, respectively;
the first median portion having a median width Wc at least equal to 20% and at most equal to 50% of the total width $W_T$, and comprising elements in relief that are separated from one another by cuts, each said element in relief comprising a leading face, which is adapted to come into contact with the ground first and forms an angle $A_{51}$ with a radial plane, and a trailing face, which is adapted to come into contact with the ground last and forms an angle $A_{61}$ with the radial plane;
each of the second and third lateral portions having a respective lateral width at least equal to 25% and at most equal to 40% of the total width WT, and respectively comprising elements in relief that are separated from one another by cuts, each said element in relief comprising a leading face, which forms an angle with the radial plane, and a trailing face, which forms an angle with the radial plane,
wherein the angle $A_{51}$ of the leading face of every said element in relief of the first median portion is strictly less than the angle $A_{61}$ of the trailing face of said element in relief, and wherein the angle of the leading face of every said element in relief of each of the second and third lateral portions is strictly greater than the angle of the trailing face of said element in relief,
wherein an angle of each leading face of each element in relief with respect to a circumferential plane is a same sign, and
wherein an angle of each trailing face of each element in relief with respect to the circumferential plane is a same sign,
wherein a level of coupling is given by
C/Z=X,
where:
forces Z are loads applied per portion of tread; and
forces C are corresponding coupling forces,
wherein under braking torque and in an unladen state:
the first median portion bears 80% of the total load Zv and the second and third lateral portions bear 20% of the total load Zv, and wherein with a direction of the coupling forces being reversed between the median portion and the lateral portions, an overall coupling force, equal to –X times 60% of a total load Zv, is added to an overall braking slip force.

13. The tire for a heavy vehicle of construction plant type according to claim 1, wherein under engine torque and in the laden state the first median portion bears less of a total load Zc than the second and third lateral portions, and wherein under braking torque and in the unladen state the first median portion bears more of a total load Zv than the second and third lateral portions.

14. The tire for a heavy vehicle of construction plant type according to claim 12, wherein the first median portion is symmetric with respect to an equatorial plane passing through the middle of the tread and perpendicular to the axis of rotation of the tire.

15. The tire for a heavy vehicle of construction plant type according to claim 12, wherein the angle $A_{51}$ of the leading face of every said element in relief of the first median portion is at least equal to 6° and at most equal to 12°.

16. The tire for a heavy vehicle of construction plant type according to claim 12, wherein the angle $A_{61}$ of the trailing face of every said element in relief of the first median portion is at least equal to 15° and at most equal to 35°.

17. The tire for a heavy vehicle of construction plant type according to claim 12, wherein the difference between the angle $A_{61}$ of the trailing face and the angle $A_{51}$ of the leading face of every said element in relief of the first median portion is at least equal to 5° and at most equal to 30°.

18. The tire for a heavy vehicle of construction plant type according to claim 12, wherein the angle of the leading face of every said element in relief of each of the second and third lateral portions is at least equal to 15° and at most equal to 35°.

19. The tire for a heavy vehicle of construction plant type according to claim 12, wherein the angle of the trailing face of every said element in relief of each of the second and third lateral portions is at least equal to 6° and at most equal to 12°.

20. The tire for a heavy vehicle of construction plant type according to claim 12, wherein the difference between the angle of the leading face and the angle of the trailing face of every said element in relief of each of the second and third lateral portions is at least equal to 5° and at most equal to 30°.

21. The tire for a heavy vehicle of construction plant type according to claim 12, wherein the tread is formed by the radial superposition of at least one radially inner first elastomeric material and a radially outer second elastomeric material.

22. The tire for a heavy vehicle of construction plant type according to claim 12, wherein the first median portion is formed by a median elastomeric material and each of the second and third lateral portions is formed by a lateral elastomeric material different from the median elastomeric material.

23. The tire for a heavy vehicle of construction plant type according to claim 12, wherein a level of coupling is given by $C/Z=X$, where:
forces Z are loads applied per portion of tread; and
forces C are corresponding coupling forces.

24. The tire for a heavy vehicle of construction plant type according to claim 12, wherein under engine torque and in the laden state the first median portion bears less of a total load Zc than the second and third lateral portions, and wherein under braking torque and in the unladen state the first median portion bears more of a total load Zv than the second and third lateral portions.

\* \* \* \* \*